United States Patent [19]

Yamaguchi

[11] 4,281,908
[45] Aug. 4, 1981

[54] TESSER TYPE OBJECTIVE LENS SYSTEM HAVING A REAR APERTURE STOP

[75] Inventor: Tamikazu Yamaguchi, Sakai, Japan

[73] Assignee: Minolta Camera Kabushiki Kaisha, Osaka, Japan

[21] Appl. No.: 26,829

[22] Filed: Apr. 4, 1979

[30] Foreign Application Priority Data

May 10, 1978 [JP] Japan .................. 53/55856

[51] Int. Cl.³ .................................... G02B 9/20
[52] U.S. Cl. .................................... 350/476
[58] Field of Search .................... 350/227, 476

[56] References Cited

U.S. PATENT DOCUMENTS

| 3,615,126 | 10/1971 | Kojima | 350/227 |
| 3,895,857 | 7/1975 | Imai | 350/227 |

FOREIGN PATENT DOCUMENTS

| 42-22354 | 12/1967 | Japan . | |
| 47-19387 | 6/1972 | Japan | 350/227 |
| 49-38620 | 4/1974 | Japan . | |
| 50-3163 | 1/1975 | Japan . | |
| 51-10092 | 4/1976 | Japan . | |

Primary Examiner—John K. Corbin
Assistant Examiner—Scott J. Sugarman
Attorney, Agent, or Firm—Jackson, Jones & Price

[57] ABSTRACT

An improved tesser type objective lens system having a rear aperture stop with a relatively wide field angle of about 60° and an F-number of about F 2.8 is provided. The thickness of the second negative lens in the lens system is increased relative to the total axial distance of the lens system which permits the reduction of the Petzval sum while maintaining a balance correction of spherical aberration and coma.

7 Claims, 18 Drawing Figures

Spherical Aberration

Astigmatism

Distortion

Lateral Aberration (ω=30°)

Lateral Aberration (ω=19°)

Spherical Aberration

Astigmatism

Distortion

Lateral Aberration (ω=30°)

Lateral Aberration (ω=19°)

Spherical Aberration

Astigmatism

Distortion

Lateral Aberration (ω=30°)

Lateral Aberration (ω=19°)

TESSER TYPE OBJECTIVE LENS SYSTEM HAVING A REAR APERTURE STOP

BACKGROUND OF THE INVENTION

1. Field of the Invention

The present invention relates to a tesser type lens system having an aperture stop located at the rear of the lens system and more particularly to a lens system of this type having a relatively wide field angle of about 60° and an F-number of about F. 2.8.

2. Description of the Prior Art

The prior art is quite familiar with various forms of tesser type lens systems having a rear aperture stop. These photographic objectives are frequently used in compact cameras, for example, to facilitate the incorporation of a shutter mechanism into the camera body. Numerous examples of prior art literature exist disclosing a tesser type lens system having an aperture stop located at the rear of the lens system so that the aperture stop can be controlled by a relatively simple mechanism. The prior art has recognized that it is difficult to effectively correct astigmatism and field curvature in the zonal area of the image if the field angle is desired to be increased to 60°.

Although numerous examples of prior art references indicate that this is a close art, there is still room for improvement in correcting abberations such as astigmatism, field curvature and coma in the zonal to marginal areas of the image.

Examples of relevant prior art can be found in U.S. Pat. No. 3,615,126 and U.S. Pat. No. 3,895,857. Additional tesser type objective lens systems having rear aperture stops are disclosed in Japanese Utility Model Publication No. 42-22354, Japanese Patent Publications Nos. 50-3163 and 51-10092 and Japanese Patent Application Laid-Open to Public Inspection No. 49-38620.

SUMMARY OF THE INVENTION

It is an object of the present invention to provide an improved tesser type lens system having a rear aperture stop wherein aberrations associated with a field angle of approximately 60° can be favorably corrected.

The tesser type objective lens system includes from image to object side a first positive meniscus lens, a second negative lens, and a third positive doublet consisting of a positive element and a negative element cemented to the positive element on its image side. Finally an aperture stop is located at the image side of the doublet. This lens system fulfills the following conditions:

| (1) | 0.3 | < | $D_3/(D_1 + D_2 + D_3)$ | <0.45 |
|---|---|---|---|---|
| (2) | 0.05F | < | $D_3$ | <0.08F |
| (3) | 0.03F | < | $D_4$ | <0.045F |
| (4) | −2.4F | < | $R_3$ | <−1.6F |
| (5) | 0.25F | < | $R_6$ | <0.33F |
| (6) | 0.13 | < | $N_4-N_3$ | <0.22 |
| (7) | $(N_1 + N_4)/2 > 1.75$ | | | | wherein:

F represents the focal length of the entire lens system;

$D_i$ represents the i-th axial distance from the object side;

$R_i$ represents the radius of curvature of the i-th surface from the object side; and $N_i$ represents the refractive index of the i-th glass material from the object side with respect to the ray of d-line.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE PREFERRED EMBODIMENTS

The following description is provided to enable any person skilled in the optical art to make and use the invention and sets forth the best mode contemplated by the inventor for carrying out his invention. Various modifications however, will remain readily apparent to those skilled in the art, since the generic principles of the present invention have been defined herein specifically to provide an improved tesser type objective lens system having a rear aperture stop with favorable corrections of various higher order aberrations.

The derivation of the formulae and the relation set forth herein can be accomplished with the assistance of a computer. The present invention represents the parameters of a compromise balance of acceptable aberrations in a relatively easily manufactured and economical lens system for utilization, for example, with a camera.

Various examples of the present invention will hereinafter be described with reference to tabulated physical and optical characteristics in various Tables. The parameters of the lens elements of the present invention are listed in separate embodiments corresponding to the Figures which are illustrated diagrammatically. As usual, in conventional lens diagrams, the light is assumed to travel from left to right. The lenses are disclosed as assembled into three separate optical units. Both in the diagrams and in the Tables the radii of curvature of the lenses are indicated by R, with a subscript corresponding to the consecutive number of the lens element surfaces from object to image side.

In the Tables, a negative sign indicates the radii on centers of curvature lying on the object side of their vertices. In both the Figures and the Tables, the axial spacings are disclosed as, D, along the optical axis and include both the axial spacings between the lens elements and thickness of the lens elements.

All linear dimensions are given in absolute values and are given with reference to an equivalent focal length of unity. The Tables also provide with respect to each example, the intended relative aperture and the total field of view 2ω. Finally, the refractive index is designated, N, while the Abbe Number is designated ν.

Figure 1:
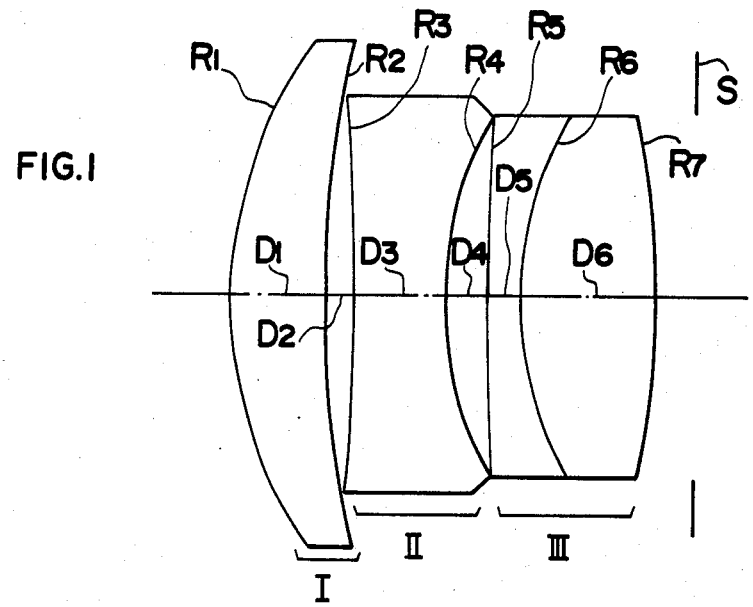
FIG. 1 represents a cross sectional view of a first embodiment of the present invention.
Figure 3:
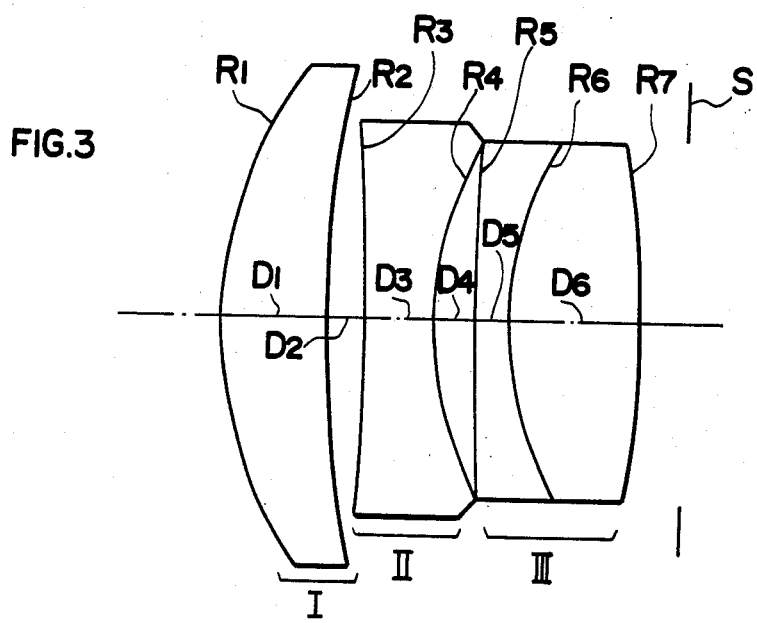
FIG. 3 represents a cross sectional view of a second embodiment of the present invention.
Figure 4A:
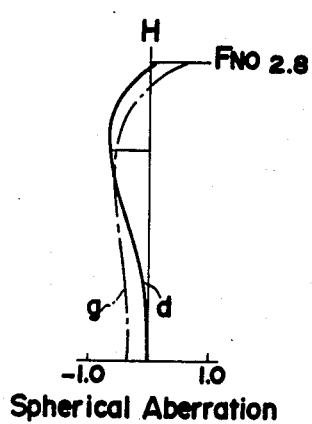
FIGS. 4a, 4b, 4c, 4d and 4e represent graphic plots of various aberrations of the second embodiment.
Figure 4B:
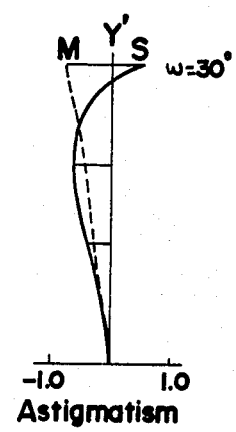
Figure 4C:
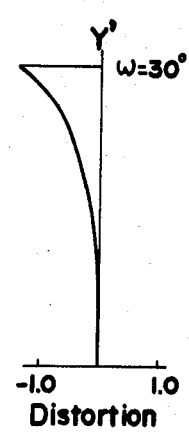
Figure 4D:
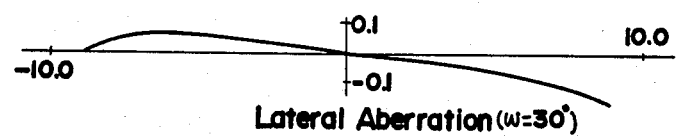
Figure 4E:
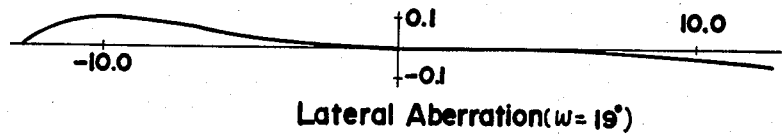
Figure 5:
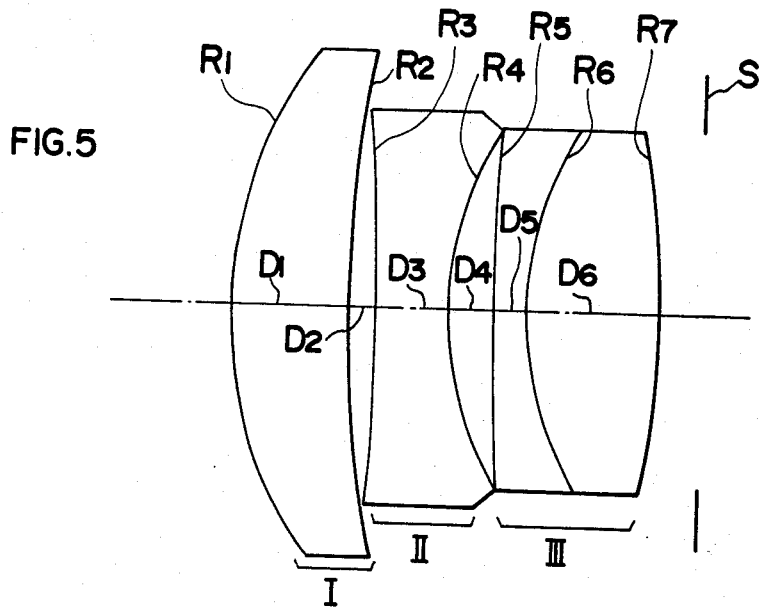
FIG. 5 represents a cross sectional view of a third embodiment of the present invention.
Figure 6A:
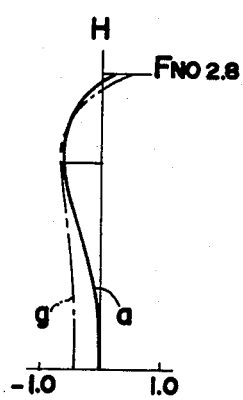
FIGS. 6a, 6b, 6c, 6d and 6e represent graphic plots of various aberrations of the third embodiment.
Figure 6B:
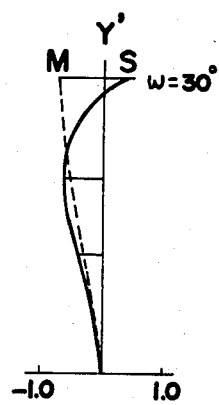
Figure 6C:
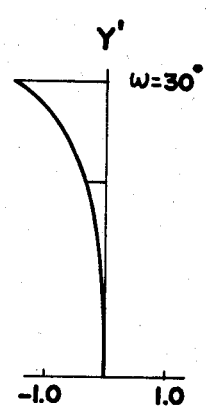
Figure 6D:
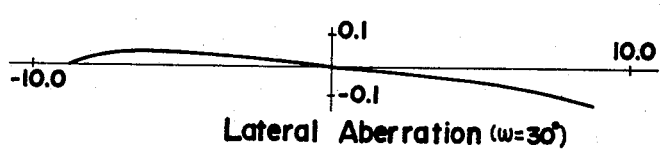
Figure 6E:
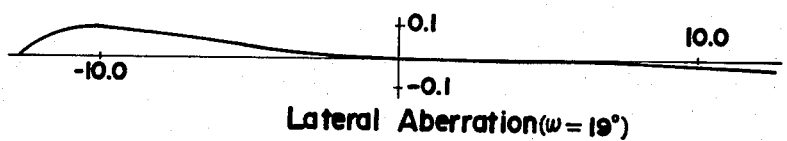

FIGS. 1, 3 and 5 utilize lens elements of basically the same configuration with only the dimensions varying between each embodiment. Accordingly different reference numbers are not necessary and a diagram of each embodiment is conveniently located adjacent the aberration graphs for convenient reference to the lens designer.

With reference to FIGS. 1, 3 and 5 and in accordance with the present invention, a tesser type objective lens system having a rear aperture stop, S, comprises a first positive meniscus lens I convex to the object side; a second negative lens II located at the image side of the first positive meniscus lens I, and a third positive doublet III located at the image side of the second negative lens II. The third positive doublet consists of a positive element and a negative element cemented to the positive element by an intermediate cementing surface, $R_6$, convex to the object side. The aperture stop S is located at the image side of the third doublet III. The lens system of the present invention fulfills the following conditions:

| | | | |
|---|---|---|---|
| (1) 0.3 | < | $D_3/(D_1 + D_2 + D_3)$ | <0.45 |
| (2) 0.05F | < | $D_3$ | <0.08F |
| (3) 0.03F | < | $D_4$ | <0.045F |
| (4) −2.4F | < | $R_3$ | <−1.6F |
| (5) 0.25F | < | $R_6$ | <0.33F |
| (6) 0.13 | < | $N_4-N_3$ | <0.22 |
| (7) $(N_1 + N_4)/2 > 1.75$ | | | | wherein:
F represents the focal length of the entire lens system;
$D_i$ represents the i-th axial distance from the object side;
$R_i$ represents the radius of curvature of the i-th surface from the object side; and
$N_i$ represents the refractive index of the i-th glass material from the object side with respect to the ray of d-line.

The following is an explanation of the purpose of the above seven parameters of the present invention. As noted in the description of the prior art, there has existed a general difficulty in effectively correcting astigmatism and field curvature in a tesser type lens system having a rear aperture. This problem existed because in a conventional design the Petzval sum could not be successfully reduced while at the same time maintaining a proper balance correction of spherical aberration and coma. In other words, the conventional design technique for reducing a Petzval sum by increasing the index of refraction for the positive lens elements in the lens system while reducing the index of refraction of the negative lens elements in the lens system would inevitably deteriorate the corrections of the spherical aberration and coma.

The present invention has adopted a novel design technique for reducing the Petzval sum while maintaining the corrections of spherical aberration and coma so that both astigmatism and field curvature as well as the spherical aberration and coma are correctly balanced.

In accordance with the present invention, this correction is achieved by increasing the thickness $D_3$ of the second negative lens II relative to the total axial distance, $D_1+D_2+D_3$, to a greater degree than that suggested in a conventional tesser type lens design. By means of this relatively increased thickness of $D_3$, the front surface $R_3$ of the second negative lens II is located closer to the front surface $R_1$ of the whole lens system. This allows the second negative lens II to utilize glass material of a relatively low refractive index to successfully reduce the Petzval sum, while the corrections of spherical aberration and coma can still be balanced. Conditions (1) and (2) relate to this particular design technique. In those cases wherein the lower limit of condition (1) or (2) is violated it will be difficult to desirably reduce the Petzval sum.

If the upper limit of these conditions are violated the chromatic aberration with respect to a shorter wavelength of light will be overcorrected in the zonal to marginal area of the image. Additionally if the upper limit of condition (2) is violated the lens design will fail to meet the criterion of a compact lens system which is necessary in commercially acceptable lenses. As a supplement to conditions (1) and (2), condition (7) is also utilized for reducing the Petzval sum, by requiring the refractive indices for the positive lens elements to be relatively high.

Conditions (3) through (6) are designed to insure the appropriate balance correction of coma in the zonial to marginal area of the image. By adherence to these conditions, it is possible to increase the absolute value of the radius of curvature $R_3$ of the front surface of the second negative lens II in accordance with the increase of its lens thickness $D_3$. It is also possible to give the cemented surface $R_6$ a suitably great refractive power by means of reducing the radius of curvature $R_6$ and increasing the difference between the refractive indices $N_3$ and $N_4$ at both sides of the surface $R_6$. Additionally, the airspace $D_4$ between the second negative lens II and the third doublet III will be reduced. It has been found difficult to correct coma if any one of the following limits are violated, the upper limit of condition (3); both the upper and lower limits of condition (4); the upper limit of condition (5) and the lower limit of condition (6). The lower limit of condition (3) further defines a limit of a practical lens arrangement. Finally, it should be noted that an excessively large refractive power to the cementing surface $R_6$ will result in causing an under correction of the meridional field curvature if the lower limit of condition (5) or upper limit of condition (6) is violated.

Figure 2A:
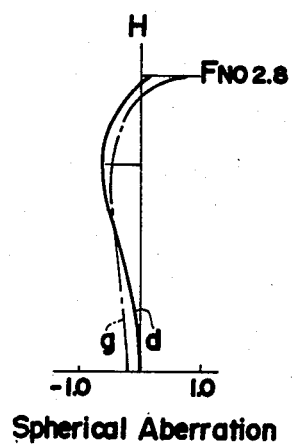
FIGS. 2a, 2b, 2c and 2e represent graphic plots of various aberrations of the first embodiment.
Figure 2B:
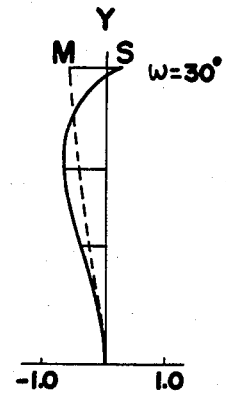
Figure 2C:
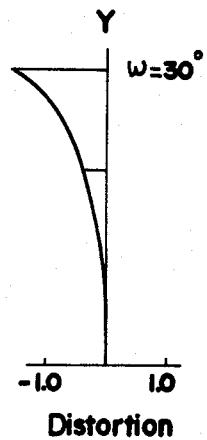
Figure 2D:
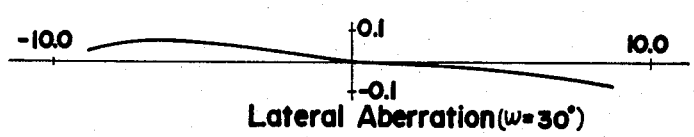
Figure 2E:
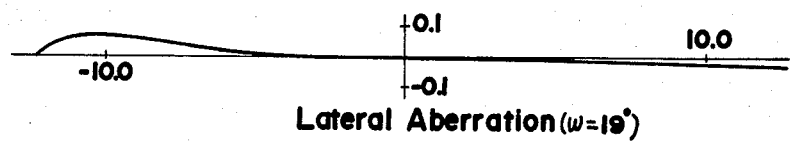

Tables 1 through 3 show respectively 3 embodiments of the present invention. FIG. 1 corresponds to Table 1 while FIG. 2a discloses spherical aberration, FIG. 2b discloses astigmatism, FIG. 2c discloses distortion, and FIG. 2d discloses lateral aberration for a field angle of 30° while FIG. 2e discloses lateral aberration for a field angle of 19°. FIG. 3 corresponds to Table 2 with the aberrations being set forth in FIGS. 4a through 4e. FIG. 5 corresponds to Table 3 with the aberrations being set forth in FIGS. 6a through 6e.

TABLE 1

| Embodiment 1 | | | | | | | |
|---|---|---|---|---|---|---|---|
| F = 100 | | 1 : 2.8 | | $2\omega = 60°$ | | | |
| Radius of Curvature | | Axial Distance | | Refractive Index | | Abbe Number | |
| $R_1$ | 34.04 | $D_1$ | 8.0 | $N_1$ | 1.7885 | $\nu_1$ | 45.7 |
| $R_2$ | 100.9 | $D_2$ | 2.5 | | | | |
| $R_3$ | −220.3 | $D_3$ | 7.5 | $N_2$ | 1.6727 | $\nu_2$ | 32.2 |
| $R_4$ | 29.53 | $D_4$ | 3.5 | | | | |
| $R_5$ | 203.0 | $D_5$ | 3.0 | $N_3$ | 1.6477 | $\nu_3$ | 33.9 |
| $R_6$ | 28.3 | $D_6$ | 11.0 | $N_4$ | 1.805 | $\nu_4$ | 41.0 |
| $R_7$ | −86.43 | S (Aperture Stop) | | | | | |

TABLE 2

Embodiment 2

$F = 100 \quad 1:2.8 \quad 2\omega = 60°$

| | Radius of Curvature | | Axial Distance | | Refractive Index | | Abbe Number |
|---|---|---|---|---|---|---|---|
| $R_1$ | 34.07 | $D_1$ | 9.0 | $N_1$ | 1.781 | $\nu_1$ | 44.5 |
| $R_2$ | 101.5 | $D_2$ | 3.5 | | | | |
| $R_3$ | −184.6 | $D_3$ | 5.5 | $N_2$ | 1.7174 | $\nu_2$ | 29.4 |
| $R_4$ | 30.6 | $D_4$ | 3.5 | | | | |
| $R_5$ | 204.7 | $D_5$ | 3.0 | $N_3$ | 1.6727 | $\nu_3$ | 32.2 |
| $R_6$ | 28.82 | $D_6$ | 11.0 | $N_4$ | 1.8340 | $\nu_4$ | 37.1 |
| $R_7$ | −79.9 | S (Aperture Stop) | | | | | |

TABLE 3

Embodiment 3

$F = 100 \quad 1:2.8 \quad 2\omega = 60°$

| | Radius of Curvature | | Axial Distance | | Refractive Index | | Abbe Number |
|---|---|---|---|---|---|---|---|
| $R_1$ | 34.26 | $D_1$ | 10.0 | $N_1$ | 1.781 | $\nu_1$ | 44.5 |
| $R_2$ | 103.1 | $D_2$ | 2.4 | | | | |
| $R_3$ | −194.1 | $D_3$ | 6.0 | $N_2$ | 1.683 | $\nu_2$ | 31.5 |
| $R_4$ | 29.94 | $D_4$ | 3.7 | | | | |
| $R_5$ | 218.0 | $D_5$ | 3.0 | $N_3$ | 1.6398 | $\nu_3$ | 34.6 |
| $R_6$ | 29.65 | $D_6$ | 11.0 | $N_4$ | 1.805 | $\nu_4$ | 41.0 |
| $R_7$ | −81.78 | S (Aperture Stop) | | | | | |

It is to be further understood that various modifications of the generic concepts of this invention are possible without departing from its spirit and accordingly the scope of the present invention should be determined solely from the following claims.

What is claimed is:

1. An improved tesser type objective lens system having a rear aperture stop comprising:
   a first positive meniscus lens convex to the object side;
   a second negative lens located at the image side of the first positive meniscus lens;
   a third positive doublet located at the image side of the second negative lens, the third positive doublet consisting of a positive element and a negative element cemented to the positive element by an intermediate cemented surface convex to the object side; and
   an aperture stop located at the image side of the third doublet, wherein the lens system fulfills the following conditions:

| | | | |
|---|---|---|---|
| 0.3 | < | $D_3/(D_1 + D_2 + D_3)$ | < 0.45 |
| 0.05F | < | $D_3$ | < 0.08F |
| 0.03F | < | $D_4$ | < 0.045F |
| −2.4F | < | $R_3$ | < −1.6F |
| 0.25F | < | $R_6$ | < 0.33F |
| 0.13 | < | $N_4-N_3$ | < 0.22 |
| | | $(N_1 + N_4)/2 > 1.75$ | | wherein:
F represents the focal length of the whole lens system;
$D_i$ represents the i-th axial distance from the object side;
$R_i$ represents the radius of curvature of the i-th surface from the object side; and
$N_i$ represents the refractive index of the i-th glass material from the object side with respect to the ray of d-line.

2. An improved tesser lens system comprising the following design parameters:

$F = 100 \quad 1:2.8 \quad 2\omega = 60°$

| | Radius of Curvature | | Axial Distance | | Refractive Index | | Abbe Number |
|---|---|---|---|---|---|---|---|
| $R_1$ | 34.04 | $D_1$ | 8.0 | $N_1$ | 1.7885 | $\nu_1$ | 45.7 |
| $R_2$ | 100.9 | $D_2$ | 2.5 | | | | |
| $R_3$ | −220.3 | $D_3$ | 7.5 | $N_2$ | 1.6727 | $\nu_2$ | 32.2 |
| $R_4$ | 29.53 | $D_4$ | 3.5 | | | | |
| $R_5$ | 203.0 | $D_5$ | 3.0 | $N_3$ | 1.6477 | $\nu_3$ | 33.9 |
| $R_6$ | 28.3 | $D_6$ | 11.0 | $N_4$ | 1.805 | $\nu_4$ | 41.0 |
| $R_7$ | −86.43 | S (Aperture Stop) | | | | | |

3. An improved tesser lens system comprising the following design parameters:

$F = 100 \quad 1:2.8 \quad 2\omega = 60°$

| | Radius of Curvature | | Axial Distance | | Refractive Index | | Abbe Number |
|---|---|---|---|---|---|---|---|
| $R_1$ | 34.07 | $D_1$ | 9.0 | $N_1$ | 1.781 | $\nu_1$ | 44.5 |
| $R_2$ | 101.5 | $D_2$ | 3.5 | | | | |
| $R_3$ | −184.6 | $D_3$ | 5.5 | $N_2$ | 1.7174 | $\nu_2$ | 29.4 |
| $R_4$ | 30.6 | $D_4$ | 3.5 | | | | |
| $R_5$ | 204.7 | $D_5$ | 3.0 | $N_3$ | 1.6727 | $\nu_3$ | 32.2 |
| $R_6$ | 28.82 | $D_6$ | 11.0 | $N_4$ | 1.8340 | $\nu_4$ | 37.1 |
| $R_7$ | −79.9 | S (Aperture Stop) | | | | | |

4. An improved tesser lens system comprising the following design parameters:

$F = 100 \quad 1:2.8 \quad 2\omega = 60°$

| | Radius of Curvature | | Axial Distance | | Refractive Index | | Abbe Number |
|---|---|---|---|---|---|---|---|
| $R_1$ | 34.26 | $D_1$ | 10.0 | $N_1$ | 1.781 | $\nu_1$ | 44.5 |
| $R_2$ | 103.1 | $D_2$ | 2.4 | | | | |
| $R_3$ | −194.1 | $D_3$ | 6.0 | $N_2$ | 1.683 | $\nu_2$ | 31.5 |
| $R_4$ | 29.94 | $D_4$ | 3.7 | | | | |
| $R_5$ | 218.0 | $D_5$ | 3.0 | $N_3$ | 1.6398 | $\nu_3$ | 34.6 |
| $R_6$ | 29.65 | $D_6$ | 11.0 | $N_4$ | 1.805 | $\nu_4$ | 41.0 |
| $R_7$ | −81.78 | S (Aperture Stop) | | | | | |

5. An improved tesser type objective lens system having a field angle of about 60° and a rear aperture stop comprising:
   a first positive meniscus lens convex to the object side;
   a second negative lens located at the image side of the first positive meniscus lens;
   a third positive doublet located at the image side of the second negative lens, the third positive doublet consisting of a positive element and a negative element cemented to the positive element by an intermediate cemented surface convex to the object side; and
   an aperture stop located at the image side of the third doublet, wherein the lens system fulfills the following conditions:

| | | | |
|---|---|---|---|
| 0.3 | < | $D_3/(D_1 + D_2 + D_3)$ | < 0.45 |
| 0.05F | < | $D_3$ | < 0.08F |
| −2.4F | < | $R_3$ | < −1.6F |
| 0.25F | < | $R_6$ | < 0.33F |
| 0.13 | < | $N_4-N_3$ | < 0.22 | wherein:
F represents the focal length of the whole lens system;
$D_i$ represents the i-th axial distance from the object side;

$R_i$ represents the radius of curvature of the i-th surface from the object side; and $N_i$ represents the refractive index of the i-th glass material from the object side with respect to the ray of d-line.

6. The invention of claim 5 wherein the index of refraction of the second negative lens is approximately 1.7 or less.

7. An improved tesser type objective lens system having a field angle of approximately 60° and a rear aperture stop comprising from object to image side:
   a first positive meniscus lens convex to the object side;
   a relatively thick second negative lens with an index of refraction of approximately 1.7 or less, located at the image side of the first positive meniscus lens;
   a third positive doublet located at the image side of the second negative lens, the third positive doublet consisting of a positive element and a negative element with an intermediate surface convex to the object side; and
   an aperture stop located at the image side of the third doublet, wherein the lens system fulfills the following conditions to permit a reduction in the Petzval Sum below a conventional tesser value while still maintaining a balanced correction of spherical aberration, coma, astigmatism, and field curvature:

$$0.3 < \frac{D_3}{D_1 + D_2 + D_3} < 0.45$$
$$0.055F \leq D_3 < 0.08F$$

wherein:
   $D_i$ represents the i-th axial distance of both air spaces and lens thicknesses and F represents the focal length of the entire lens system.

* * * * *